(12) United States Patent
Dubosc et al.

(10) Patent No.: US 11,053,810 B2
(45) Date of Patent: Jul. 6, 2021

(54) ASSEMBLY OF TURBINE ENGINE PARTS COMPRISING A FAN BLADE HAVING AN INTEGRATED PLATFORM, AND CORRESPONDING TURBINE ENGINE

(71) Applicant: Safran Aircraft Engines, Paris (FR)

(72) Inventors: Matthieu Pierre Michel Dubosc, Paris (FR); Benjamin Bulot, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 79 days.

(21) Appl. No.: 15/835,372

(22) Filed: Dec. 7, 2017

(65) Prior Publication Data
US 2018/0163556 A1 Jun. 14, 2018

(30) Foreign Application Priority Data

Dec. 12, 2016 (FR) ...................................... 1662309

(51) Int. Cl.
*F01D 11/00* (2006.01)
*F01D 5/22* (2006.01)
(Continued)

(52) U.S. Cl.
CPC ............ *F01D 11/008* (2013.01); *F01D 5/143* (2013.01); *F01D 5/22* (2013.01); *F01D 5/282* (2013.01);
(Continued)

(58) Field of Classification Search
CPC ..... F01D 11/008; F01D 11/006; F01D 11/005
(Continued)

(56) References Cited

U.S. PATENT DOCUMENTS 1,554,614 A * 9/1925 Allen ........................ F01D 5/22
416/190
3,990,813 A * 11/1976 Imai ......................... F01D 5/22
416/196 R
(Continued)

FOREIGN PATENT DOCUMENTS

FR 1374917 10/1964
JP S6022002 2/1985
(Continued)

OTHER PUBLICATIONS

Safran Aircraft Engines, "French Preliminary Search Report," FR Application No. 1662309 (dated Aug. 22, 2017) (with English translation cover sheet).

*Primary Examiner* — Ninh H. Nguyen
*Assistant Examiner* — Jason Fountain
(74) *Attorney, Agent, or Firm* — Womble Bond Dickinson (US) LLP

(57) ABSTRACT

The invention relates to an assembly of turbine engine (50) parts having a longitudinal axis (X), the assembly comprising at least two adjacent fan blades made of a 3D woven composite material, each blade (1) comprising a root (3), a vane (2) extending from the root (3), and an integrated platform (4) inserted between the root (3) and the vane (2), the platform (4) extending on either side of the vane (2) and forming a pressure face platform portion (4I) and a suction face platform portion (4E), the pressure face and suction face platform portions of adjacent blades being connected by a fin (14) extending at least radially at the outer side of the pressure face and suction face platform portions (4I, 4E), relative to the longitudinal axis (X), having a substantially triangular transverse cross section and extending axially and so as to upper overlap the longitudinal edges (11A, 11B) of (Continued)

the pressure face and suction face platform portions (4I, 4E) of the adjacent blades.

11 Claims, 4 Drawing Sheets

(51) Int. Cl.
  *F01D 5/28*   (2006.01)
  *F04D 29/32*   (2006.01)
  *F04D 29/64*   (2006.01)
  *F04D 29/08*   (2006.01)
  *F04D 29/66*   (2006.01)
  *F01D 5/14*   (2006.01)

(52) U.S. Cl.
  CPC .......... *F01D 11/006* (2013.01); *F04D 29/083* (2013.01); *F04D 29/322* (2013.01); *F04D 29/324* (2013.01); *F04D 29/644* (2013.01); *F04D 29/667* (2013.01); *F01D 5/146* (2013.01); *F01D 5/147* (2013.01); *F05D 2220/36* (2013.01); *F05D 2240/80* (2013.01); *F05D 2250/11* (2013.01); *F05D 2250/23* (2013.01); *F05D 2260/30* (2013.01); *F05D 2300/603* (2013.01); *Y02T 50/60* (2013.01)

(58) Field of Classification Search
  USPC .................................................. 416/193 A
  See application file for complete search history.

(56) References Cited

U.S. PATENT DOCUMENTS

| | | | |
|---|---|---|---|
| 4,580,946 A * | 4/1986 | Bobo | F01D 11/006 |
| | | | 416/190 |
| 7,021,898 B2 * | 4/2006 | Elliott | F01D 5/081 |
| | | | 416/193 A |
| 8,105,039 B1 * | 1/2012 | El-Aini | F01D 11/008 |
| | | | 416/195 |
| 2013/0004326 A1 * | 1/2013 | McCaffrey | F01D 5/147 |
| | | | 416/241 B |

FOREIGN PATENT DOCUMENTS

| | | |
|---|---|---|
| WO | WO-2014099102 | 6/2014 |
| WO | WO-2015092306 | 6/2015 |
| WO | WO-2016066954 | 5/2016 |

* cited by examiner

ASSEMBLY OF TURBINE ENGINE PARTS COMPRISING A FAN BLADE HAVING AN INTEGRATED PLATFORM, AND CORRESPONDING TURBINE ENGINE

1. FIELD OF THE INVENTION

The present invention relates to the field of turbine engines and in particular to dual-flow turbine engines in which the airflows circulate from upstream downstream. It relates more specifically, but not exclusively, to an assembly of turbine engine parts comprising fan blades having an integrated platform.

2. PRIOR ART

Dual-flow turbine engines comprise, in a known manner, a movable fan arranged upstream of a gas generator according to the circulation of gases in the turbine engine. The gas generator is housed in an annular inner casing while the fan is housed in an annular outer casing. Said inner and outer casings are separated by an annular inter-duct casing so as to delimit a primary duct and a secondary duct. The fan comprises a plurality of fan blades and a disc, from which each blade extends substantially radially. The free ends of the blades face the outer casing so as to compress an incident air flow at least in the secondary duct and, preferably, also in the primary duct. The turbine engine is known as a ducted fan turbine engine. The air flow circulating in the primary duct is conventionally compressed by compressor stages of the turbine engine before entering the combustion chamber. The combustion energy is recovered by turbine stages which help drive the compressor stages and the fan. The air flow circulating in the secondary duct for its part participates in the thrust of the turbine engine.

The fan blade is a complex part, as its design requires a multi-disciplinary team which must cope at the same time with the aerodynamic, mechanical and acoustic aspects. The main objectives of the design of the fan are aerodynamic performance, mechanical strength and the reduction of mass, noise and cost. It is necessary in particular to guarantee the lifetime of the blade and of the disc, the resistance of the fan to vibrations, resistance to the ingestion of foreign bodies and resistance to the loss of a blade.

To meet the objectives concerning the reduction of mass, some blades have been produced in a composite material which is lighter than metal. One of the focuses of research into the technological improvement of fan blades made of a composite material consists in incorporating the platform therein. Usually, the platform is a separate part which maintains the aerodynamic aspect in order to avoid flow breaks. Said platform is directly connected to the disc and at the limit of contact with the fan blade. Incorporation of the platform to form an integral blade allows, on the one hand, the space requirement to be limited, assembly to be facilitated and also the mass to be reduced and, on the other hand, makes it possible to reduce leakages, better master sealing, and minimise the ratio of the fan hub to the space requirement of a given disc. Such integrated platform blades made of a composite material are known from WO2016/066954.

However, said blades may produce problems, for example manufacturing problems or problems of complying with requirements for assembly quality. These difficulties must be managed from an aerodynamic point of view and from an integration point of view, for example in order to avoid misalignment of the platforms so as to maintain a duct having a good aerodynamic quality, to avoid too much play, and to maintain in particular good mechanical strength of the platforms. In particular, it has been found that the two lateral longitudinal sides of the platforms of each blade move opposingly. Thus, at a junction with an adjacent platform, significant play could appear between the left-hand side of a platform and the right-hand side of the adjacent platform. This could result in aerodynamic leakages and thus reduced performance. Moreover, wear of the platforms at the junction thereof is a problem that must be considered.

3. OBJECT OF THE INVENTION

The object of the present invention is in particular to propose a solution that makes it possible to reduce the movements between the platforms of the fan blades made of a composite material, while improving the aerodynamic aspect and limiting the impact on drag.

4. DISCLOSURE OF THE INVENTION

This object is achieved according to the invention by an assembly of turbine engine parts having a longitudinal axis, the assembly comprising at least two adjacent fan blades made of a 3D woven composite material, each blade comprising a root, a vane extending from the root, and an integrated platform inserted between the root and the vane, the platform extending on either side of the vane, forming a pressure face platform portion and a suction face platform portion, the pressure face and suction face platform portions of adjacent blades being connected by a fin extending at least radially on the outer side of the platform portions, relative to the longitudinal axis, having a substantially triangular transverse cross section and extending so as to axially upper overlap the longitudinal edges of the pressure face and suction face platform portions of the adjacent blades.

Said longitudinal edges may also be described as lateral platform edges. The overlap is therefore advantageously on the junction of said edges. In other words, the fin extends radially above the junction of the longitudinal edges of the platform portions and overlaps the junction of the longitudinal edges at the upper portion (on a radial axis).

In the present application, the expression 'integrated platform' means a platform which is made in a single piece together with the vane and the root of the fan blade. In other words, the blade and the platform are formed in one piece.

Thus, this solution allows the above-mentioned object to be achieved. In particular, the addition of a fin as an aerodynamic link system between the platforms both helps limit opposing transverse movements between the platforms which cause aerodynamic leakages, and helps guide and limit the passage vortices which are generated between the roots of the blades. Moreover, said fin makes it possible to reduce the vibrations to which the integrated platform blades are subjected in the region of the platforms, depending on the loadings. Said fin advantageously makes use of the rigidity at the mutual interface of the corresponding platforms.

According to an embodiment of the invention, the fin comprises a base extending radially on the inner side of the platforms, so as to lower overlap the longitudinal edges of the pressure face and suction face platform portions of adjacent blades. The base on the inner side, in addition to the existence of the fin radially on the outer side, benefits performance in terms of resistance to the centrifugal stresses to which the fan blades are subject. Moreover, the inner side and the outer side may result from non-interlinking of a 3D woven reinforcement preform of the composite blade, making for easier production for the impregnation of the preform with resin when casting the corresponding blade.

In an embodiment of the invention, the fin is attached between the adjacent pressure face and suction face platform portions. This configuration allows a mechanical link to be established between the adjacent platforms. Said attached fin also allows the aerodynamic properties of the fan to be improved, for example by promoting the mutual support of the platforms in optimised geometric conditions.

In another embodiment of the invention, the fin is made up of two fin portions which are each integral with one of the pressure face and suction face platform portions. This configuration allows the transverse movements between the platforms to be limited and also makes it possible to improve the aerodynamic properties of the root of the fan. When a base is present, said platforms improve the contact between the fins in order to reduce possible gaps there between under the effect of centrifugal stresses for example.

According to another feature of the invention, the fin has a height of between 3% and 20% of the height of a secondary duct, upstream of which the fan blades extend.

According to another feature, the fin may have a substantially constant height along the structure average line thereof. However, according to another feature, the fin may have a variable height, increasing from upstream to downstream along the structure average line thereof.

According to another feature of the invention, the fin has a length substantially equal to the length of the axial chord of the vanes extending axially between a leading edge and a trailing edge.

Advantageously, but not in a limiting way, the base is connected to the body of the fin by a lug which is arranged so as to form two grooves, each receiving a longitudinal edge of the pressure face and suction face platform portions.

According to another feature of the invention, the longitudinal edges of the pressure face and suction face platforms are the result of a non inter-linking of the 3D weave. A feature of this kind allows the platforms of the blades to be strengthened. In particular, said non inter-linking occurs between the chain thread layers forming the platform portions intended to form a vane preform.

According to yet another feature of the invention, the fin is made of a composite material.

According to a feature of the invention, the turbine engine is a dual-flow turbine engine.

The invention also relates to a turbine engine comprising at least one assembly according to any of the above-mentioned features.

5. BRIEF DESCRIPTION OF THE FIGURES

The invention will be better understood, and other objects, details, features and advantages thereof will appear more clearly on reading the following detailed explanatory description of embodiments of the invention, given as purely illustrative and non-limiting examples, with reference to the accompanying drawings, in which.

6. DESCRIPTION OF EMBODIMENTS OF THE INVENTION

Figure 1:
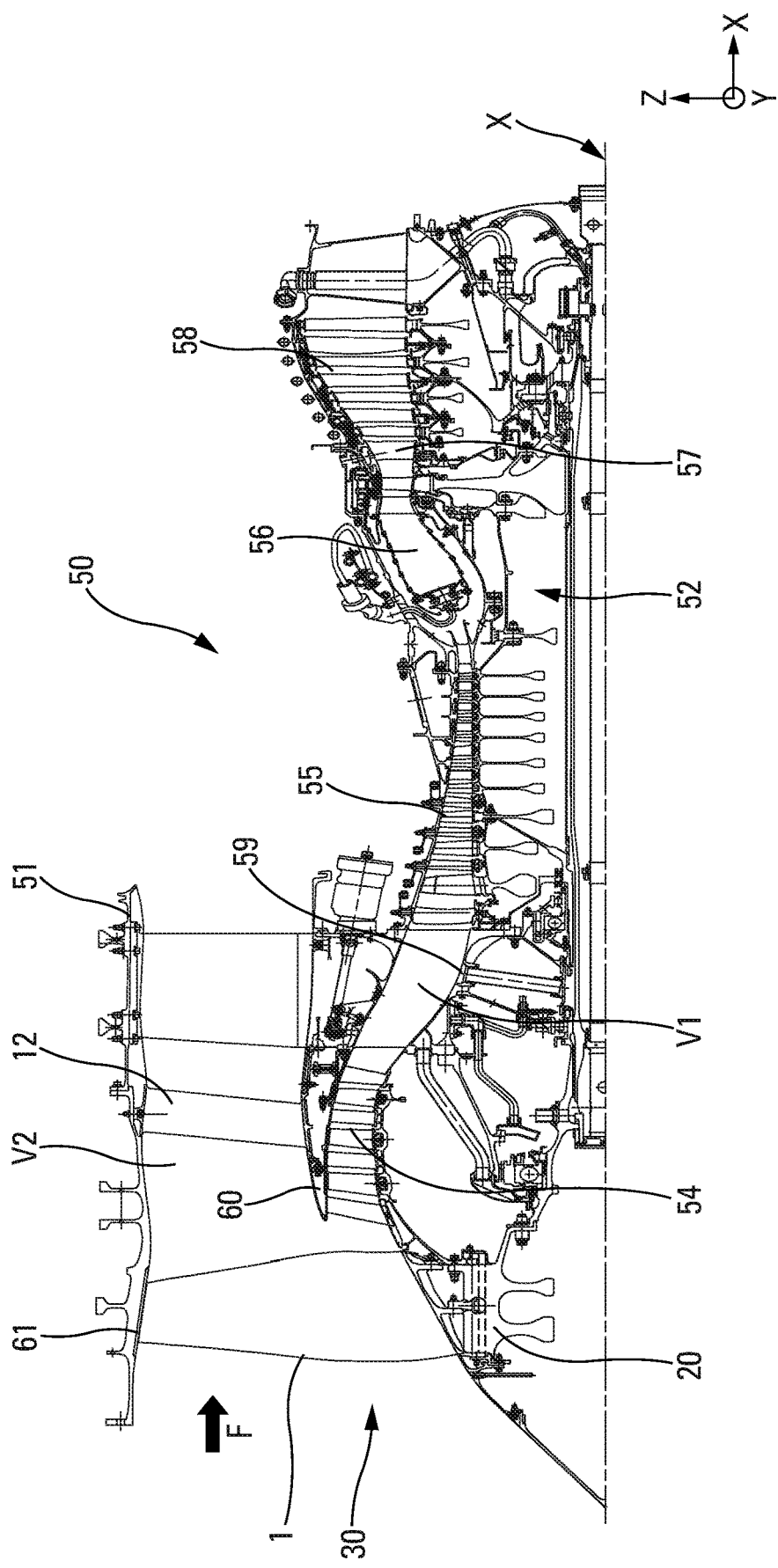
FIG. 1 is a schematic view of a turbine engine comprising a fan upstream of a gas generator, and to which the invention relates.

FIG. 1 shows a turbine engine 50 such as a turbojet engine for an aircraft, to which the invention relates. Said turbine engine 50 is in this case a dual-flow turbine engine which extends along a longitudinal axis X. The turbine engine 50 generally comprises an external nacelle 51 that surrounds a gas generator 52, upstream of which a fan 30 is mounted. In the present invention, and in a general manner, the terms 'upstream' and 'downstream' are defined in relation to the circulation of gases in the turbine engine. The terms 'upper', 'lower', 'outer' and 'inner' are defined in relation to a radial axis Z perpendicular to the axis X and in relation to the distance relative to the longitudinal axis X. A transverse axis Y is also perpendicular to the longitudinal axis X and to the radial axis Z. Said axes, X, Y, Z, shown in FIG. 1, form an orthonormal coordinate system.

In this example, the gas generator 52 comprises, from upstream to downstream, a low-pressure compressor 54, a high-pressure compressor 55, a combustion chamber 56, a high-pressure turbine 57 and a low-pressure turbine 58. The gas generator 52 is housed in an inner casing 59.

In this case, the fan 30 is ducted and is also housed in the nacelle 51. The fan 30 compresses the air entering the turbine engine 50, which air is divided into a hot air flow circulating in an annular primary duct V1 which passes through the gas generator 52, and a cold air flow circulating in an annular secondary duct V2 around the gas generator 52. In particular, the primary duct V1 and the secondary duct V2 are separated by an annular inter-duct casing 60 arranged between the nacelle 51 and the inner casing 59. The hot air flow circulating in the primary duct V1 is conventionally compressed by compressor stages 54, 55 before entering the combustion chamber 56. The combustion energy is recovered by turbine stages 57, 58 which drive the compressor stages and the fan. The cold air flow F circulating in the secondary duct V2 is oriented along the longitudinal axis and, for its part, participates in supplying the thrust of the turbine engine. The nacelle 51 has a generally cylindrical shape. The nacelle 51 comprises a collar 61 which is rigidly connected thereto and surrounds a plurality of movable fan blades 1.

At least one stator blade 12 or fixed radial blade is arranged downstream of the fan blades 1, making it possible to guide the cold air flow generated by the fan 30. In the present invention, the term 'fixed blade' or 'stator blade' means a blade that is not rotated about the axis X of the turbine engine. In other words, said stator blade is distinct from and unlike a movable blade or rotor blade of the turbine engine. The stator blades 12 are arranged transversally in the fan nacelle 51, substantially in a plane transverse to the longitudinal axis X in the secondary duct V2. Said blades are distributed evenly about the axis X of the turbine engine 50. By way of example, between ten and fifty stator blades 12 are necessary to guide the cold air flow. Said blades do not form part of the subject matter of the invention.

Figure 2:
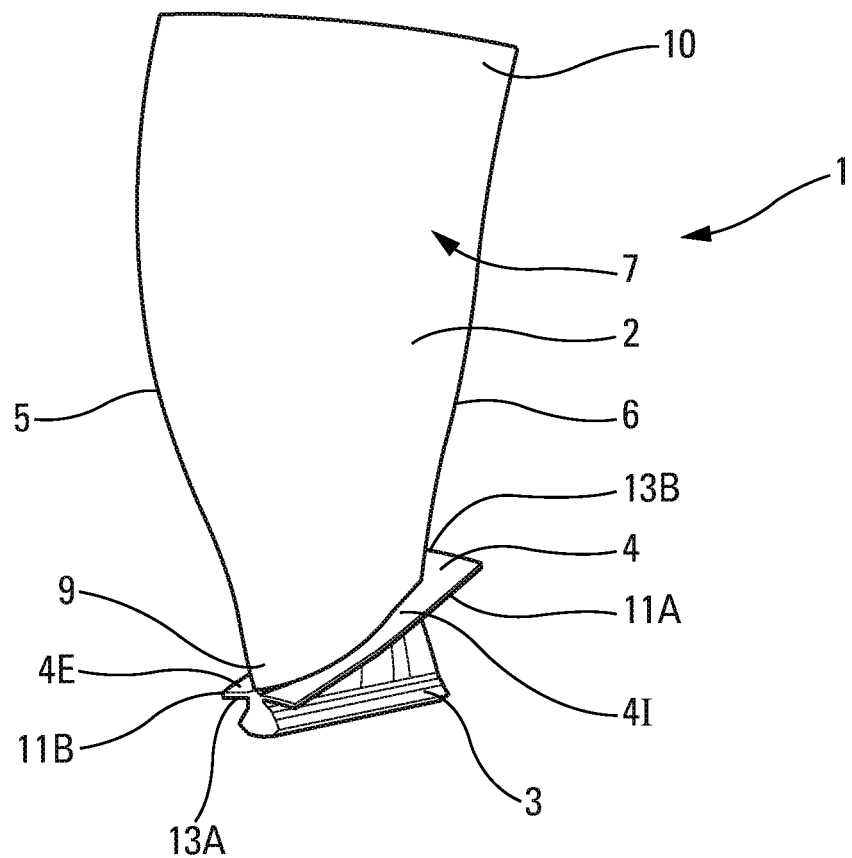
FIG. 2 is a perspective view of an example of a fan blade to which the invention may relate.

With reference to FIGS. 1 and 2, the fan blades are distributed evenly about the axis X of the turbine engine. Said blades 1 are mounted on a disc 20 that forms a hub and is rotated along the axis X relative to the nacelle 51 by a fan shaft. Said shaft is connected to a power shaft of the gas generator 52. Each fan blade 1 comprises a vane 2, a root 3 and a platform 4 which is inserted between the root 3 and the vane 2. The vane 2 is swept by the air flow entering the fan 30. Said fan extends radially at the upper portion of the platform 4, between a tip end 10 and a root end 9. The tip end 10 of the vane 2 faces the collar 61. The vane 2 also has a pressure surface 7 and a suction surface extending axially between an upstream leading edge 5 and a downstream trailing edge 6. The pressure and suction surfaces are therefore opposite each other transversely. An axial chord, the length of which may be constant or may increase between the root end and the tip end of the vane 2, extends between the trailing edge 6 and the leading edge 5. The root 3 is intended to be installed in the disc 20 through which the fan shaft passes. In particular, the root 3 has a substantially trapezoidal transverse cross section and is intended to engage in a complementary channel of the disc 20 to rigidly connect the blade to the disc 20.

The platform 4 is integral with the root 3 and the vane 2 in order to form an integral blade. The platform is therefore integrated. In the present example, the platform 4 extends transversely on either side of the vane 2 to form a suction face platform portion 4E and a pressure face platform portion 4I. The platform 4 has a substantially parallelepiped shape. More precisely, the platform 4 extends axially between a first upstream border 13A, situated in the same plane as the leading edge 5 in the region of the root end 9. A second opposite downstream border 13B is also situated in the plane of the trailing edge 6, also in the region of the root end 9. The platform 4 also extends between two longitudinal, transversally opposite lateral edges 11A, 11B. In this case said platform has a constant thickness. The platform 4 is also distributed evenly over the circumference of the disc 20.

The integral blade is made of a 3D composite material woven from a fibrous preform. FIGS. 3 to 6 show two embodiments of an assembly of turbine engine parts comprising two adjacent blades 1 of a fan 30. Said assembly also comprises a fin 14 as a link system in order to connect the pressure face and suction face platform portions of adjacent blades. The shape of the fin 14 is also specifically designed in order to limit the transverse movements between the platforms and to improve the passage of the flow, while limiting the formation of a passage vortex between the root ends 9 of the vanes 2 of adjacent blades.

Figure 3:
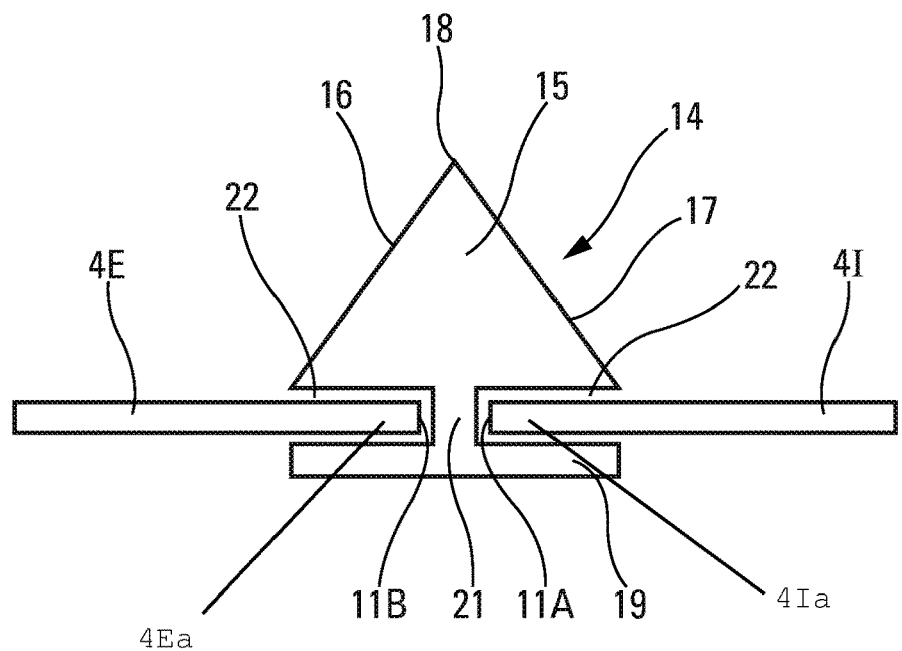
FIG. 3 is a partial schematic front view of an assembly of turbine engine parts comprising two fan blade platforms connected by a fin.
Figure 4:
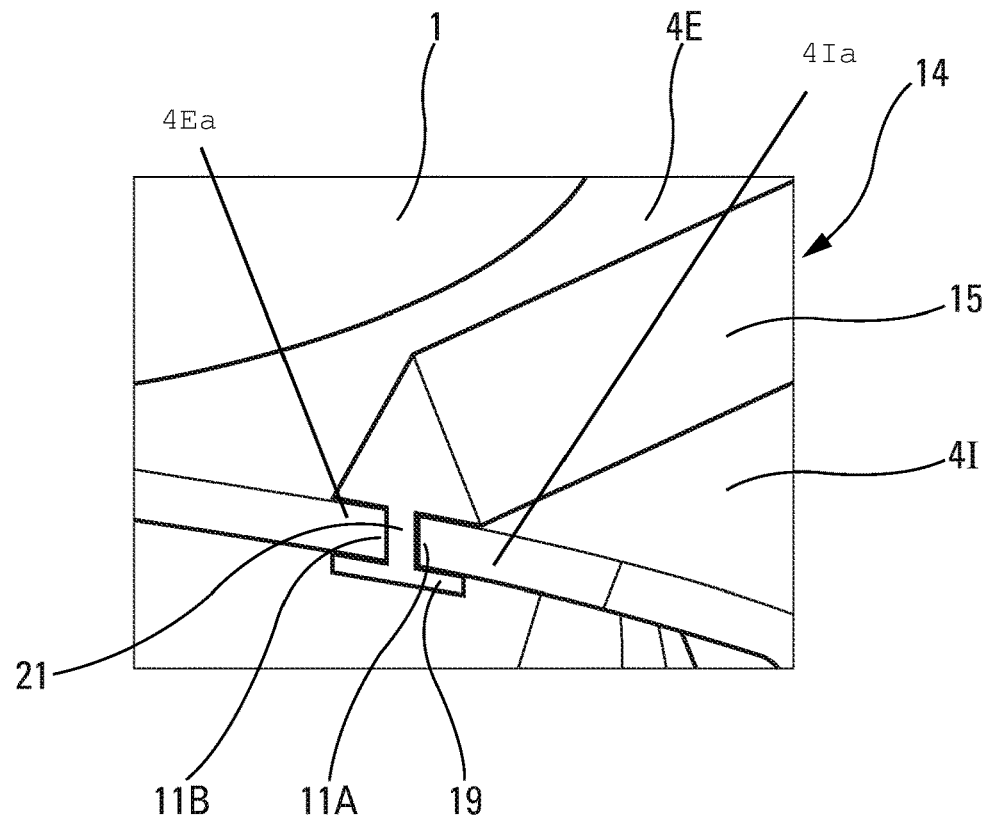
FIG. 4 is a perspective view of an assembly of parts according to FIG. 3.

With reference to FIGS. 3 and 4, which schematically show a first embodiment of the assembly of turbine engine parts, the fin 14 is brought and attached. The term 'attached' means that the fin 14 is a distinct part separate from the platform 4 and is not produced at the same time as the platform. The fin 14 is designed, in particular, to connect a suction face platform portion 4E of a first blade and a pressure face platform portion 4I of a second adjacent blade. The length of the fin 14 between the leading edge and the trailing edge thereof may for example correspond to 50% of the length of the axial chord at the blade root end and may for example be as much as 100% of said axial chord length.

Said fin 14 is substantially triangular in shape and is arranged so as to be substantially equidistant between the pressure surface of the first blade and the suction surface of the second adjacent blade. 'Triangular shape' means that the fin has a substantially triangular cross section at the outer side of the platform portions. The fin 14 comprises a body 15 that is elongate in a direction substantially parallel to the longitudinal axis X. In particular, the fin 14 extends between the upstream border 13A and the downstream border 13B of the pressure face and suction face platform portions 4I, 4E. The elongate body 15 has said substantially triangular transverse cross section, comprising a base and two sloping or oblique faces 16, 17 extending from said base and meeting at the upper portion in the region of an arris 18. The body of the fin 14 extends radially outwards relative to the longitudinal axis.

The fin 14 also comprises a base 19 extending radially at the lower portion of the platforms 4. The base 19 extends radially on the inner side of the platforms, so as to lower overlap the longitudinal edges 11A, 11B of the pressure face and suction face platform portions of adjacent blades, at the junction of said edges and substantially following the curvature of said edges. In particular, the fin 14 comprises a lug 21 connecting the base 19 to the body 15 of the fin 14. Said lug 21 is arranged so as to form two grooves 22 radially between the body 15 and the base 19. Each groove 22 is intended to receive one of the longitudinal lateral edges 11A, 11B, of the pressure face and suction face platform portions. As can be seen in FIGS. 3 and 4, the lug 21 extends radially between the longitudinal edges 11A, 11B of the pressure face and suction face platform portions. The body 15 overlaps the pressure face and suction face platform portions at the upper portion. The base 19 also faces the lower surfaces of the pressure face and suction face platform portions. The fin 14, in particular the body 15, extends inside the secondary duct V2. Said fin has a height of between 3 and 20% of the height of the secondary duct V2. The height of the body of the fin 14 is for example between 5 mm and 50 mm. Said height is for example substantially constant along the structure average line of the fin 14. The structure average line defines the trajectory of the fin 14. The average line in this case is rectilinear. Alternatively, the mid-line may have a curvature substantially parallel to that of the vanes. Moreover, in a variant that has not been shown, the fin 14 has a variable height increasing from upstream to downstream along the structure average line thereof. The height may therefore vary continuously between 3 and 20% of the height of the secondary duct, more particularly between 5 and 10% for example, between the leading edge and the trailing edge of the fin 14.

In this case, the fin 14 is made of a composite material.

Figure 5:
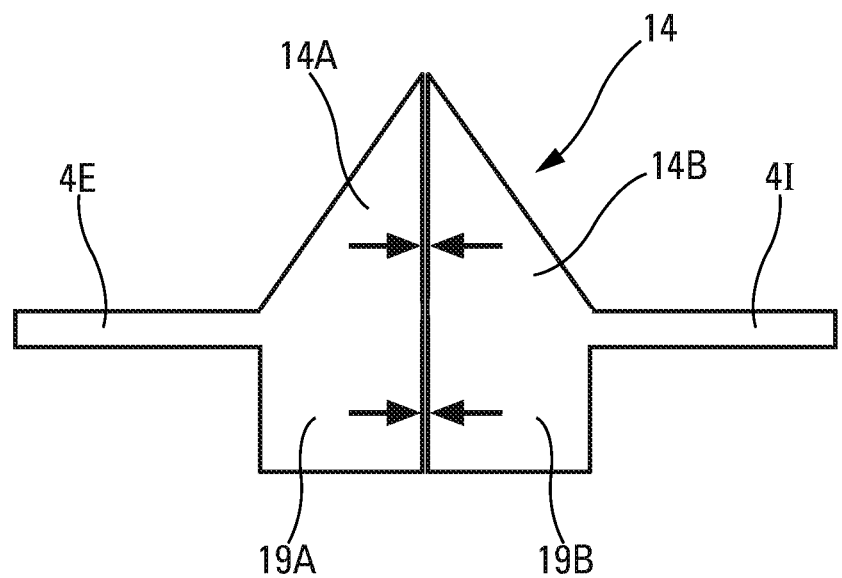
FIG. 5 is a partial schematic front view of another embodiment of an assembly of turbine engine parts according to the invention; and, FIG. 6 is a perspective view of the assembly of parts of FIG. 5.
Figure 6:
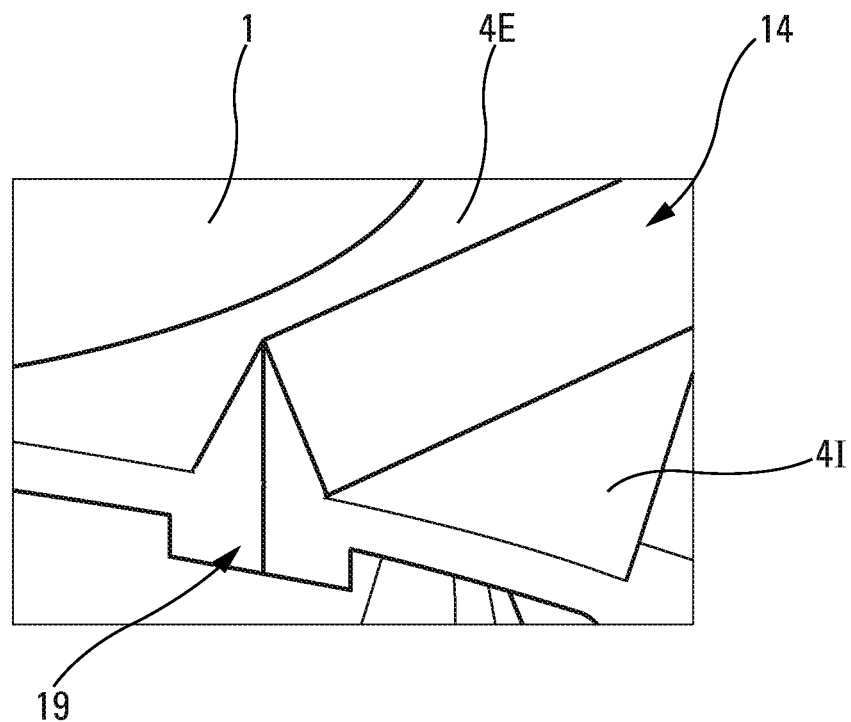

With reference to FIGS. 5 and 6, which schematically show a second embodiment of the assembly of turbine engine parts, the fin 14 is integral with the integrated platforms of the blades. Said fin 14 has the same features as the fin of the first embodiment as regards its height, shape, etc. Said fin 14 differs in particular in that it is formed by two fin portions 14A, 14B which, once placed side by side, form said fin 14. The pressure face and suction face platform portions are connected at the site of the junction of the fin portions 14A, 14B. It will be understood, as illustrated in FIGS. 5 and 6, that said fin portions overlap the longitudinal edges of the platform at the upper portion. In particular, a first portion 14A and a second portion 14B are transversely opposite. The first and second portions 14A, 14B are each integral with one of the pressure face and suction face platform portions 4I, 4E. In other words, each pressure face and suction face platform portion comprises a first or a second fin portion 14A, 14B. The first and second fin portions 14A, 14B extend radially outwards relative to the longitudinal axis X. In particular, the first and second fin portions also extend inside the secondary duct V2. Each first and second fin portion also extends radially from the longitudinal edges 11A, 11B of the pressure face and suction face platform portions. The first and second fin portions each also have a substantially triangular transverse cross section.

The fin 14 also comprises a base 19 extending radially at the lower portion of the platforms 4. The base 19, like the fin 14, in this embodiment, is made up of two portions 19A, 19B which extend radially along each longitudinal edge 11A, 11B of the pressure face and suction face platforms. When the fan blades are mounted one after the other adjacently about the longitudinal axis X, the pressure face and suction face platform portions, and the fin portions, are adjacent and placed side by side to form a fin 14. The base portions 19A, 19B are also adjacent and placed side by side. The fin and base portions make it possible to reduce or even eliminate the opposing transverse movements and vibrations, and make it possible to reduce the passage vortices generated between the root ends of the vanes.

The invention has been described in relation to a fan blade but it applies, of course, to other rotor or, if applicable, stator blades comprising integrated platforms that are subjected to opposing transverse movements creating aerodynamic leakages, and for which the passage vortices influence the performance thereof.

The invention claimed is:

1. An assembly of turbine engine parts having a longitudinal axis X, the assembly comprising at least two adjacent fan blades made of a 3D woven composite material, each blade comprising a root, a vane extending from the root, and an integrated platform inserted between the root and the vane, the platform extending on either side of the vane and forming a pressure side platform portion and a suction side platform portion, the pressure side and suction side platform portions having each an outer surface and an inner surface which are joined by a longitudinal edge, wherein in that the pressure side and suction side platform portions of adjacent fan blades are connected by a fin extending at least radially at an outer side of the pressure face and suction side platform portions, relative to the longitudinal axis X, the fin being configured to limit opposing transverse movements between the platforms, and to guide and limit passage vortices generated between the blades, wherein the fin having an elongated body with a substantially triangular transverse cross section which extends radially outwards relative to the longitudinal axis and axially over the outer surfaces of the pressure side and the suction side platform portions so as to cover topside longitudinal edges of the pressure side and the suction side platform portions of the adjacent fan blades, wherein the fin comprises a base extending radially under the inner surfaces of the platforms and so as to cover underside longitudinal edges of the pressure side and the suction side platform portions of the adjacent fan blades, wherein the fin is rigid and made of a composite material.

2. An assembly according to claim 1, wherein the fin is attached between the adjacent pressure side and suction side platform portions.

3. An assembly according to claim 1, wherein the base is connected to the body of the fin by a lug which is arranged so as to form two grooves, each receiving a longitudinal edge of the pressure side and suction side platform portions.

4. An assembly according to claim 1, wherein the fin has a height of between 3% and 20% of the height of the fan blades.

5. An assembly according to claim 1, wherein the fin has a substantially constant height along the structure average line thereof.

6. An assembly according to claim 1, wherein the fin has a variable height, increasing from upstream to downstream, along the structure average-line thereof.

7. An assembly according to claim 1, wherein the fin has a length that is substantially equal to the length of the axial chord of the vanes, extending between a leading edge and a trailing edge.

8. An assembly according to claim 1, wherein the fin is made of a composite material.

9. A turbine engine comprising a fan provided with a plurality of blades, wherein the turbine engine comprises at least one assembly according to claim 1, said assembly comprising said adjacent fan blades.

10. An assembly according to claim 1, wherein the base comprises a lower surface which extends radially inside the inner surfaces of the platforms.

11. An assembly of turbine engine parts having a longitudinal axis, the assembly comprising at least two adjacent fan blades made of a 3D woven composite material, each blade comprising a root, a vane extending from the root, and an integrated platform inserted between the root and the vane, the platform extending on either side of the vane and forming a pressure side platform portion and a suction side platform portion, wherein the pressure side and suction side platform portions of adjacent fan blades are connected by a fin extending at least radially at the outer side of the pressure face and suction side platform portions, relative to the longitudinal axis, wherein the fin is configured to limit opposing transverse movements between the platforms, and to guide and limit passage vortices generated between the blades, wherein the fin has a substantially triangular transverse cross section and extending axially, wherein the fin is made up of two fin portions which are each made in one piece with one of the pressure side and suction side platform portions, wherein the fin extends radially on both sides of each of the pressure side and suction side, the fin portion having a lower side which extends inside an inner surface of the pressure side or suction side portion wherein the fin is rigid and made of a composite material.

* * * * *